(12) United States Patent
Troyansky et al.

(10) Patent No.: US 7,496,197 B2
(45) Date of Patent: Feb. 24, 2009

(54) METHOD AND SYSTEM FOR ROBUST EMBEDDING OF WATERMARKS AND STEGANOGRAMS IN DIGITAL VIDEO CONTENT

(75) Inventors: Lidror Troyansky, Ramat Gan (IL); Ofir Carny, Kochav Yair (IL)

(73) Assignee: PortAuthority Technologies Inc., San Diego, CA (US)

( * ) Notice: Subject to any disclaimer, the term of this patent is extended or adjusted under 35 U.S.C. 154(b) by 820 days.

(21) Appl. No.: 10/170,456

(22) Filed: Jun. 14, 2002

(65) Prior Publication Data

US 2003/0031318 A1 Feb. 13, 2003

Related U.S. Application Data

(60) Provisional application No. 60/297,799, filed on Jun. 14, 2001.

(51) Int. Cl.
*H04N 7/16* (2006.01)
*H04N 9/80* (2006.01)

(52) U.S. Cl. ...................... 380/202; 380/200

(58) Field of Classification Search ............... 380/202, 380/217, 200; 713/176
See application file for complete search history.

(56) References Cited

U.S. PATENT DOCUMENTS

| | | | | |
|---|---|---|---|---|
| 5,664,018 A | * | 9/1997 | Leighton | 380/54 |
| 5,754,239 A | * | 5/1998 | Wilkinson | 375/240.15 |
| 5,930,369 A | * | 7/1999 | Cox et al. | 380/54 |
| 6,005,623 A | * | 12/1999 | Takahashi et al. | 375/240.16 |
| 6,101,602 A | * | 8/2000 | Fridrich | 713/176 |
| 6,154,571 A | * | 11/2000 | Cox et al. | 382/250 |
| 6,205,249 B1 | * | 3/2001 | Moskowitz | 382/232 |
| 6,208,745 B1 | * | 3/2001 | Florencio et al. | 382/100 |
| 6,246,775 B1 | * | 6/2001 | Nakamura et al. | 382/100 |
| 6,282,299 B1 | * | 8/2001 | Tewfik et al. | 382/100 |
| 6,373,960 B1 | * | 4/2002 | Conover et al. | 382/100 |
| 6,411,725 B1 | * | 6/2002 | Rhoads | 382/100 |
| 6,430,301 B1 | * | 8/2002 | Petrovic | 382/100 |
| 6,580,819 B1 | * | 6/2003 | Rhoads | 382/135 |
| 6,845,170 B2 | * | 1/2005 | Wendt | 382/100 |

OTHER PUBLICATIONS

Swanson et al., "Object-Based Transparent Video Watermarking", IEEE, 1997, pp. 369-374.*

* cited by examiner

*Primary Examiner*—Kambiz Zand
*Assistant Examiner*—William S Powers

(57) ABSTRACT

A method for robust embedding of information into video content, said method comprising of breaking said video content into a series of at least one unit; selecting at least one of said units; selecting at least one parameter for at least one of said units and performing at least one geometric transformation on said selected units according to said parameters selected for said unit, thereby to embed said information in said video content.

44 Claims, 13 Drawing Sheets

3a

3b

3c

Fig, 11a

METHOD AND SYSTEM FOR ROBUST EMBEDDING OF WATERMARKS AND STEGANOGRAMS IN DIGITAL VIDEO CONTENT

CROSS-REFERENCE TO RELATED APPLICATIONS

This application is related to and claims priority from U.S. Provisional Patent Application No. 60/297,799, filed Jun. 14, 2001.

FIELD OF THE INVENTION

The present invention relates generally to the field of substantially imperceptible digital watermarks, also known as steganograms. More specifically, the present invention relates to the construction of robust watermarks that are resistant to both malicious and non-malicious attacks.

BACKGROUND OF THE INVENTION

Illegal copying aid distribution of multimedia content (audio and video) is prevalent in recent years, especially using the Internet. This illegal copying and distribution is an infringement of copyright protection laws and cause financial damages to the rightful owners of the content. It is therefore of great interest to find methods that would stop or at least reduces illegal copying and distribution of multimedia files without offending rightful usage.

Methods for usage rights enforcement of digital media, such as video or audio are known. Some of these methods of enforcement require unique digital watermarks to be embedded into each copy of the media at the source, prior to its distribution to an authorized party. If usage of the content by an unauthorized party is identified, the identity of the authorized party who originally received the content is readily determined from the unique embedded digital watermark.

Other methods use watermarks and steganograms for digital rights management (DRM). In this case, substantially imperceptible information is embedded in the digital content. This information is able to certify usage rights regarding the digital content.

Methods for embedding substantially imperceptible messages in the form of watermarks or steganograms into content are well known. However, since watermarks should be embedded into the digital media content in a manner that does not reduce the quality of the media, it is hard to maintain robustness against malicious attempts to remove the watermark as well as against various changes to which the digital content is subjected while using legitimate digital processing and compression. In particular, it is hard to maintain robustness against averaging of several copies, where each copy contains a different watermark.

PCT application number IL01/00923 describes a method for efficient on-line, real-time watermarking of video and/or audio and/or other digital content. The method, dubbed "watermark by selection", is based on first selecting salient fractions of the content, whose removal will greatly reduce the quality of the content, then dividing each of the fragments into several segments. Each segment is then replicated N times, and each copy is marked with a special steganogram that preferably cannot be perceived by a human but can be detected by the embedder (or a suitable reader). Each replicated segment is viewed as "alphabetic symbols". On-line, real-time watermarking is based on first encoding the desired message using the above alphabetic symbols, and then selecting between alternative copies that correspond to the symbols in order to produce the analog of the desired sequence of symbols. This basic scheme can thereafter be augmented with error correcting codes and error resilience methods. However, the security of the method relies on the underlying watermarking scheme, i.e., the method by which various steganograms were embedded in the various segments.

Various attacks against watermarks are known. Malicious attacks attempts to render the watermark undetectable, e.g., by using various image-processing methods and/or averaging of several instances with different embedded steganograms. Recompression of the video with different codecs and various frame-rates also render many of the current watermarking methods ineffective.

There is thus a recognized need for, and it would be highly advantageous to have, a method and system that allow robust embedding of watermarks and steganograms in digital video, which will overcome the drawbacks of current methods as described above.

SUMMARY OF THE INVENTION

According to one aspect of the present invention, there is provided a method and system for providing a digital video signal with a substantially imperceptible message embedded therein, in a manner that is robust against attempts to render the watermark undetectable ("watermark attacks"). In one embodiment of the present invention, several copies of the original content undergo frame-based (or video object based) image transformations, such as affine transformation and/or geometric transformations, with various parameters (e.g., slightly rotating or deforming parts of the images in the various frames or video object planes within the video content). In each version one can thereafter embed frame-based watermarks. Attempts to average contents from different versions will cause blur that substantially reduces the quality of the content.

In another embodiment of the present invention, the transformations are used as a part of the watermarking process. I.e., the concealed message ("steganogram") is encoded in terms of various frame-based image transformations.

In another embodiment of the present invention, another method of robust watermark embedding is implemented. The method is based on dropping a frame from a sequence of frames, preferably copying the previous or the next frame, and preferably encodes and compresses the sequence using a different frame rate.

In another embodiment of the present invention, another method of robust watermark embedding is implemented. The method is based on tampering with the rate of various segments.

The methods that are described in the previous paragraphs are CPU intensive, which makes their on-line implementation restrictive. It is therefore preferable to perform the transformations in an off-line mode, and then use a method similar to the one described in PCT application number IL01/00923 in order to produce personalized copies of the content in real time.

The present embodiments successfully address the shortcomings of the presently known configurations by providing a method and system for embedding robust watermarks and steganograms in digital video, which can efficiently serve digital right management, audit and control.

According to a first aspect of the present invention there is provided a method for robust embedding of information into video content, the method comprising:

breaking the video content into a series of at least one unit;

selecting at least one of the units;

selecting at least one parameter for at least one of the units; and performing at least one geometric transformation on the selected units according to the parameters selected for the unit, thereby to embed the information in the video content.

Preferably, the method further comprises utilizing another, independent, method to embed information within the units.

Preferably, the information is substantially imperceptible.

Preferably, at least some of the information embedded in the units is encoded into the at least one of the parameters controlling the geometric transformations.

Preferably, the geometric transformation is operable to impede the disruption of the embedded information, wherein the disruption is performed by combining several different versions of the video content, and wherein at least one of the different versions of the video content contain different versions of the geometric transformations.

Preferably, the method further comprises restricting the amount of change of at least one of the parameters between at least two consecutive units in the series of units.

Preferably, the method further comprises locating at least one unit within the series of units, the unit being significantly different from the unit preceding the located unit, and wherein the change of at least one of the parameters between the located unit and the unit preceding the located unit is not restricted.

Preferably, the method further comprises locating at least one key unit within the series of units, the key unit being significantly different from the unit preceding the located key unit, and wherein the method comprises utilizing the information about the location of the key units in the sequence.

Preferably, the utilizing the information about the location of the key units in the sequence comprises performing the geometric transformations only on the key units in the locations.

Preferably, the utilizing the information about the location of the key units in the sequence comprises breaking the series into segments based on the information, and wherein the method further comprises utilizing the same value of at least one of the parameters for all units within the segments.

Preferably, the geometric transformation comprises an affine transformation.

Preferably, the method utilizes parameters which control the geometric transformation, and wherein at least one of the parameters depends on the spatial location within the unit.

Preferably, the method further comprises restricting the amount of change of the parameters between at least two proximate spatial locations within the at least one unit.

Preferably, at least one of the spatial locations within at least one of the units is not changed by the method.

Preferably, at least one of the parameters depends on the data within the units.

Preferably, the method further comprises reading at least some of the embedded information using image matching techniques.

The method may be performed on compressed video content, and wherein the video content is not fully decompressed and rendered during the operation of the method.

Preferably, the method further comprises the step of approval of the selection of units.

Preferably, the unit comprises at least one of the following:
a rectangular visual object;
a frame of the video content;
at least one visual object;
at least one compressed object;
a video object plane;
at least one projectable three dimensional object;
at least one four dimensional object that contains time dependent properties; at least one three dimensional object; and
at least one visually representable object.

According to a second aspect of the present invention there is provided a method for robust embedding of information in a video content, the method comprising:
breaking the video content into a series of at least one unit;
selecting at least one group of units, the group comprises at least one unit;
selecting at least one parameter for at least one of the groups; and
changing a unit rate of at least one of the groups according to the parameter selected for the group, thereby to embed information within the group.

Preferably, the information is substantially imperceptible.

The method preferably comprises utilizing another independent method to embed information within the units.

Preferably, at least some of the information embedded in the units is encoded into at least one of the parameters.

Preferably, the method is operable to impede disruption of the embedded information, wherein the disruption is performed by combing several different versions of the video content, wherein at least one of the different versions of the video content contain different versions of the change of unit rate.

Preferably, the parameter controlling the change of unit rate depends on the data within the units.

The method may be performed on compressed video content, such that the video content is not fully decompressed and rendered during the operation of the method.

Preferably, the unit comprises at least one of the following:
a rectangular visual object;
at least one visual object;
a frame of the video content; at least one compressed object;
a video object plane;
at least one projectable three dimensional object;
at least one four dimensional object that contains time dependent properties;
at least one three dimensional object; and
at least one visually representable object.

According to a third aspect of the present invention, there is provided a method for robust embedding of information in a video content, the method comprising:
breaking the video content into a series of at least one unit;
selecting at least one unit from the series; and
removing the units from the video content.

Preferably, the information is substantially imperceptible.

The method may comprise utilizing another method to embed information within the video content.

The method may impede disruption of the embedded information, wherein the disruption is performed by combining several different versions of the video content, wherein different sets of units were removed from at least one of the different versions of the video content.

Preferably, the method further comprises locating at least one key unit within the series of units, the key unit being significantly different from the unit preceding the located change unit, and wherein the method comprises utilizing the information about the location of the change units within the sequence.

Preferably, the utilizing the information about the location of the key units in the sequence comprises removing only at least one of the following:
at least one of the key units; and at least one of the units preceding the key units.

Preferably, the selection depend on the data within the units.

Preferably, at least one of the removed units is replaced by new units.

Preferably, at least one of the new units are constructed utilizing the data in at least one of the units surrounding the new unit.

Preferably, at least one of the new units is created by interpolation of at least two units.

Preferably, at least one of the new units is created by duplication of another unit.

Preferably, at least one of the new units are constructed utilizing the data in the removed unit.

Preferably, at least one of the new units are constructed utilizing the data in both the removed unit and in at least one of the units surrounding the removed unit.

Preferably, at least one of the new units is a blurred version of the removed unit.

Preferably, at least one of the blurred version of the removed units contain different levels of blur over the space of the unit and wherein the different levels of blur are dependent on the data within the unit.

Preferably, at least one of the units surrounding the new units is also blurred to reduce discontinuity in the video content.

Preferably, the method further comprises a step of approval of the selection of the units.

Preferably, the method further comprises the following steps for reducing discontinuity caused by removed units:
compressing the series in a low unit rate; and
recompressing the series in the desired unit rate.

Preferably, the method is performed on compressed video content, and wherein the video content is not fully decompressed and rendered during the operation of the method.

The method may further comprise inserting new units into the video content.

Preferably, at least one of the new units are constructed utilizing the data in on at least one of the units surrounding the new unit.

Preferably, the unit comprises at least one of the following:
a rectangular visual object;
at least one visual object;
a frame of the video content;
at least one compressed object;
a video object plane;
at least one projectable three dimensional object;
at least one four dimensional object that contains time dependent properties;
at least one three dimensional object; and
at least one visually representable object.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION OF PREFERRED EMBODIMENTS

Figure 1:
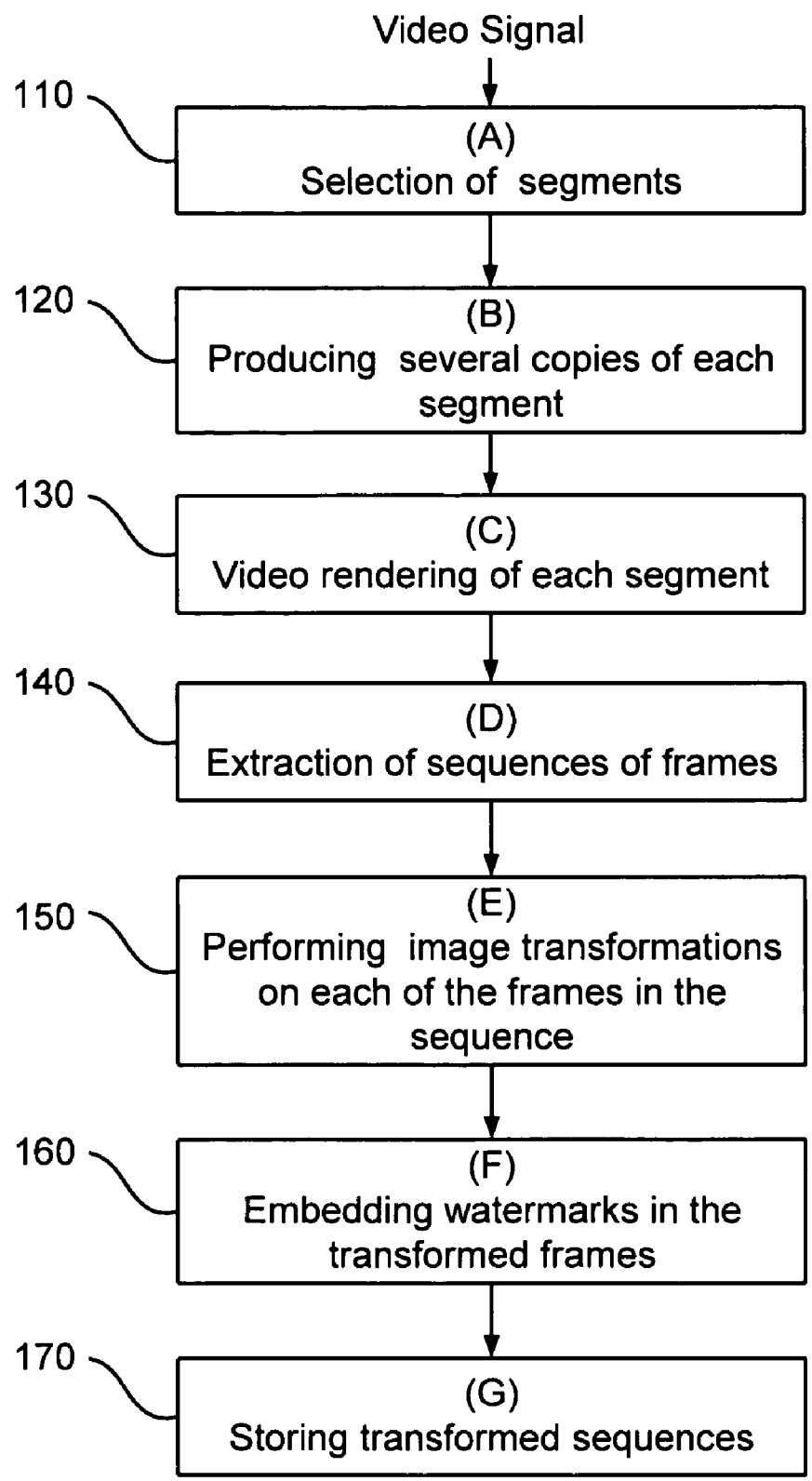
FIG. 1 illustrates a method for marking video signals in a manner that enhances its robustness against averaging, in accordance with a preferred embodiment of the present invention.

The present embodiments disclose a method and system for providing a video signal with a substantially imperceptible message embedded therein, in a manner that is robust against attempts to render the watermark undetectable, hereafter "watermark attacks", as well as against various changes to which the digital content is subjected while using legitimate digital processing and compression. In particular, preferred embodiments of the present invention provide robustness against averaging of several copies, where each copy contains a different watermark.

The principles and operation of the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Usage of steganograms and watermarks for managing and tracking of copyrighted media is considered to be a promising approach to tackle the severe problem of piracy of digital multimedia content. The validity of any watermarking method depends critically on its robustness. It is therefore of great interest to find a method that is robust against attempts to maliciously remove the watermark from the video signal.

When the watermark is used for forensic purposes, a different watermark is preferably embedded on each copy of the media content. In this case, one of the most effective attacks is to average several different copies, hereafter referred to as "averaging attack", thereby greatly reducing the detectability of the different watermarks and steganograms while using current methods.

According to a first embodiment of the present invention, sequences of frames or video object planes are provided in several copies of the original content, or copies of parts of the original content. The copies are subjected to different image transformations, such as, but mot limited to, affine or geometric transformations. In cases where copies that have been subjected to different transformations are averaged, the resulted picture will be blurred, thereby greatly reducing the quality of the content.

Referring now to the drawings, FIG. 1 illustrates a method for marking video signals in a manner that enhances its robustness against averaging, in accordance with a preferred embodiment of the present invention. The segments that are going to be transformed are located within the video signal (stage (A), as indicated by 110). Each segment is duplicated several times, thereby producing several copies of each segment (stage (B), as indicated by 120). The video signal is then rendered (stage (C), as indicated by 130), and sequences of frames are extracted (stage (D)), as indicated by 140). Each frame in the sequence is then subjected to an image transformation, (stage (E), as indicated by 150). In the case where the image transformations are affine, the pixels in a frame F1 are projected from points of the original frame F0 according to:

$$\begin{pmatrix} x_1 \\ y_1 \end{pmatrix} = \begin{pmatrix} a_0, a_1 \\ a_2, a_3 \end{pmatrix} \begin{pmatrix} x_0 \\ y_0 \end{pmatrix} + \begin{pmatrix} b_0 \\ b_1 \end{pmatrix} \qquad \text{(eq. 1)}$$

In general, the value of $x_1$ and $y_1$ are not integer, and therefore they cannot be strictly referred to as indexes for pixels. In these cases, some standard interpolation method, such as nearest-neighbors interpolation may be used in order to assign color and intensity to pixels in the transformed image. The transformation parameters $a_0$, $a_1$, $a_2$, $a_3$, $b_0$, $b_1$ are preferably different between different copies of the segments.

The impact of the transformation is to slightly rotate and/or deform parts of the images. The above group of transformations also includes the unity transformation ($x_1=x_0$, $y_1=y_0$), which leaves the image intact. In each of the transformed versions one can thereafter embed frame-based watermarks, using any of the numerous known or yet unknown methods for embedding watermarks in an image (stage (F), as indicated by 160). The transformed sequences are thereafter stored, preferably as compressed digital video signals (stage (G), as indicated by 170).

Figure 2:
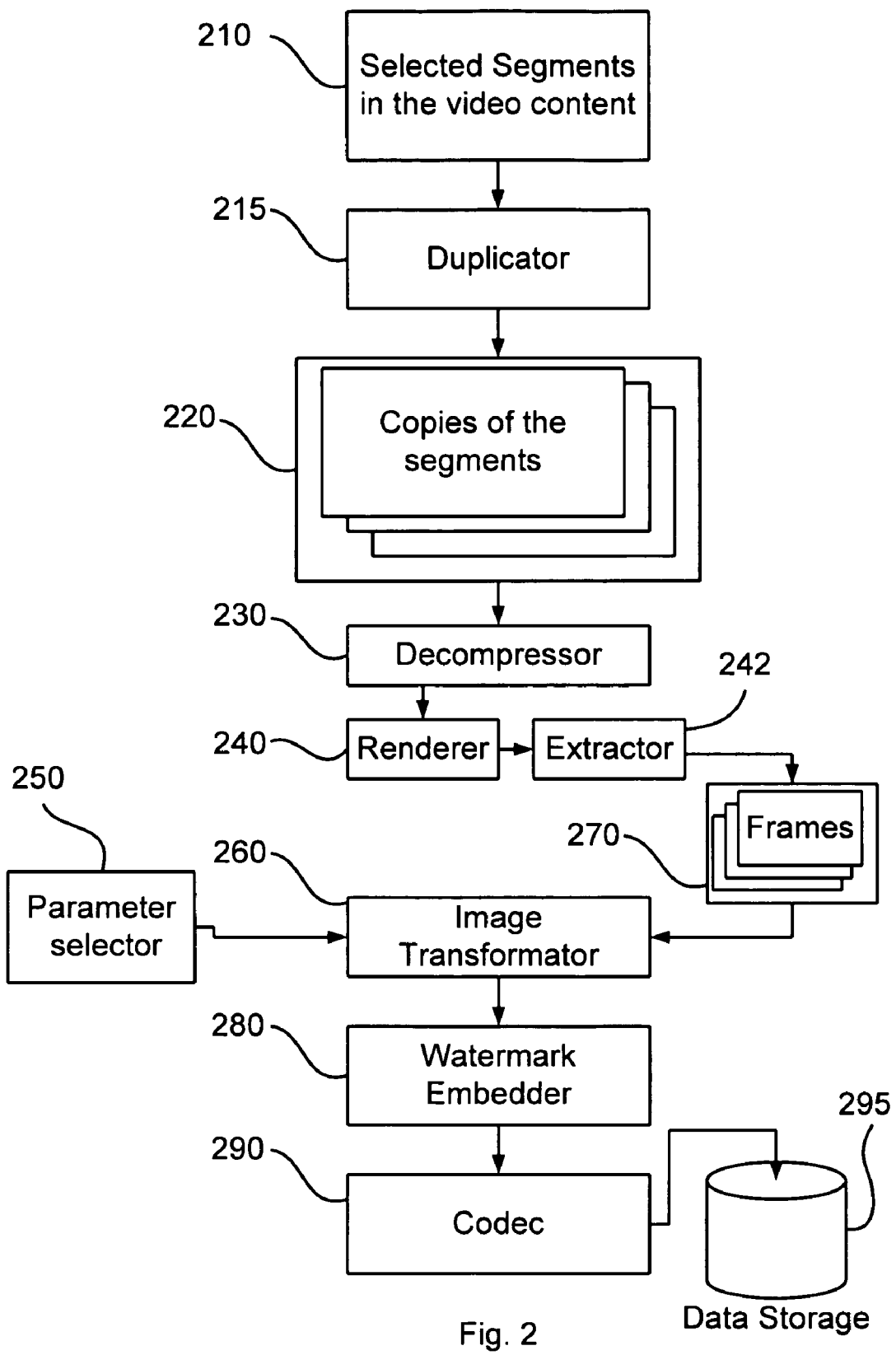
FIG. 2 illustrates a block diagram of system for robust watermarking, constructed and operative in accordance with a preferred embodiment of the present invention.

FIG. 2 illustrates a block diagram of a system for robust watermarking, constructed and operative in accordance with a preferred embodiment of the present invention. Selected segments in the video content 210 are duplicated several times by the duplicator 215 in order to produce several copies 220. Each copy is then decompressed by the decompressor 230 and is rendered by the video rendered 240. The sequence of frames 270 is extracted by the frame extractor 242. Image transformation parameters for each frame in each copy are selected by the parameter selector 250 and are fed to the image transformer 260 together with the corresponding frames 270. After transforming the frame, a unique watermark is preferably embedded on each frame by the watermark embedder 280. The sequences of transformed frames with an embedded watermark are then compressed by the Codec 290. The output, which is marked, and transformed copies of segments of the original video content are then stored in the data-storage 295.

In another embodiment of the present invention, the segments are started at the beginning of a film cut or scene and are ended at the end of a film cut or scene. Different segments can thereafter undergo different transformations without noticeable discontinuities and thereby simplify the implementation of the method.

In another embodiment of the present invention, the used parameters are changed gradually over the time and/or over the frame coordinates and are equal to pre-determined values (in some cases null) in the time that corresponds to the beginnings and ends of the segments in order to provide for seamless (i.e. non-jumpy) reassembly.

Figure 3:
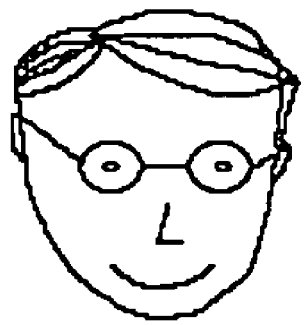
FIG. 3 contains 3 pictures: an original picture (3a), the original after it has been subjected to an affine transformation (3b) and the average of the above two pictures (3c).
Figure 3:
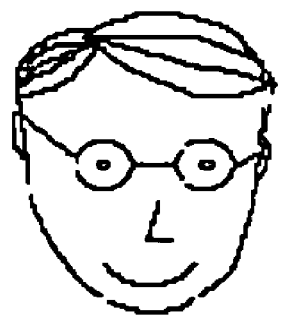
Figure 3:
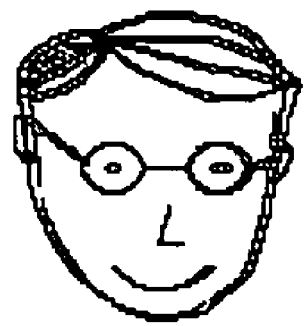

FIG. 3 shows three images: the uppermost image 310 is the original image; the central image 320 is an image that is slightly transformed. These two images look substantially the same. Averaging of the two images in an attempt to attack underlying watermark cause a blur that substantially reduces the quality of the content, as shown in bottom image 330.

Figure 4:
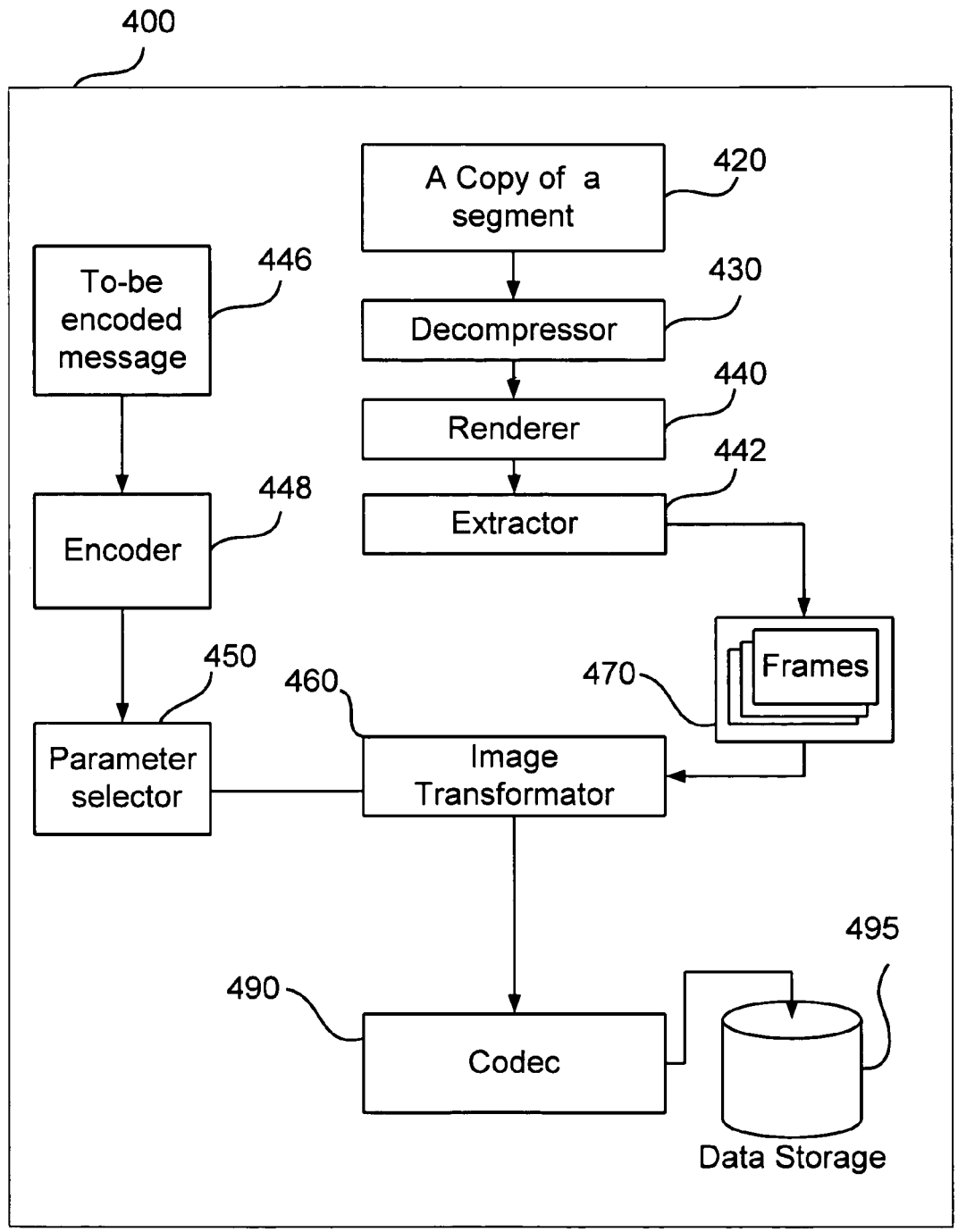
FIG. 4 illustrates a system in which the information of the hidden message (steganogram) itself is embedded using the parameters of the image transformation.

FIG. 4 illustrates a system, hereafter referred to as system 400, which is substantially similar to the system described in FIG. 1, only that now the information of the hidden message (steganogram) itself is embedded using the parameters of the image transformation (e.g., affine or geometric transformation.). A copy of a segment of the original video content 420 is decompressed by the decompressor 430 and rendered by a video renderer 440. The sequence of frames 470 is extracted by the frame extractor 442. The images in the frames are fed into the image transformer 460. The to-be-embedded message 446 is encoded in terms of a sequence of parameters by the message encoder 448. The parameter selector 450 takes the said sequence of parameters and uses it in order to characterize the transformation of each frame. E.g., in a case where the image transformation is affine, the transformation is described by the following equation:

$$\begin{pmatrix} x_1(t) \\ y_1(t) \end{pmatrix} = \begin{pmatrix} a_0(t), a_1(t) \\ a_2(t), a_3(t) \end{pmatrix} \begin{pmatrix} x_0 \\ y_0 \end{pmatrix} + \begin{pmatrix} b_0(t) \\ b_1(t) \end{pmatrix} \qquad \text{(eq. 2)}$$

Where t is the index of the frame in the segment, t=1,2,3 . . . and the message is encoded in terms of the 6-dimensional signal:

$$\begin{pmatrix} a_0(t) \\ a_1(t) \\ a_2(t) \\ a_3(t) \\ a_4(t) \\ b_0(t) \\ b_1(t) \end{pmatrix} \qquad \text{(eq. 3)}$$

The resulting parameters are used by the image transformator 460 in order to transform the images in the frames, accordingly. The resulting sequence of frames is thereafter recompressed by the video codec 490. The transformed digital video signal is thereafter stored in a storage device 495.

In a preferred embodiment of the invention, error-correcting methods are used, in order to increase the robustness of the method.

The coefficients described in equation 2 and equation 3 need not be constant over the image coordinates i.e., $a_i(t)=a_i(x,y,t)$, $b_i(t)=b_i(x,y,t)$, where x and y denote the image spatial coordinates, providing that their variation over the image is small and sufficiently smooth.

Figure 5:
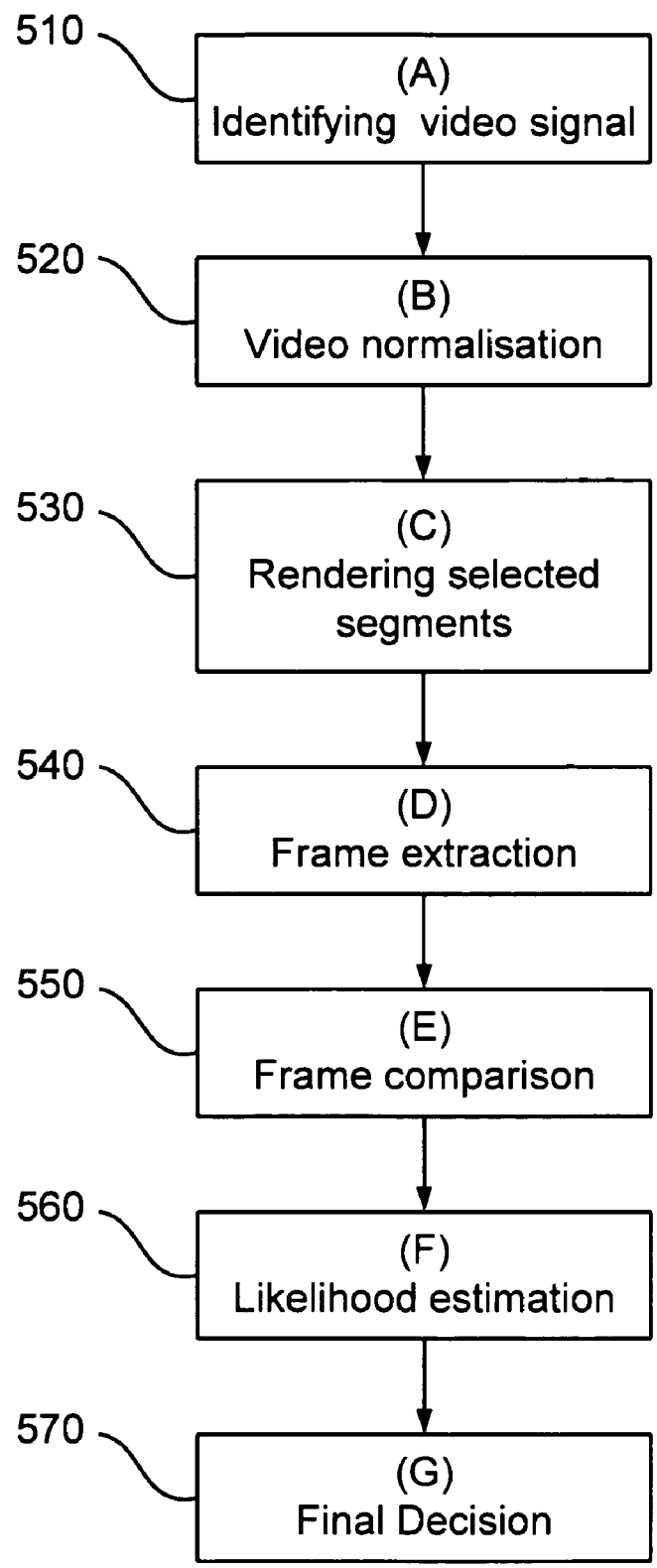
FIG. 5 is a block diagram illustrating a method for detection of the hidden messages according to a preferred embodiment of the present invention.

FIG. 5 is a sequential block diagram illustrating a method for detection of the hidden messages according to a preferred embodiment of the present invention: At the first stage, marked video sequences are identified (stage A, as indicated by 510), the identification can be done manually or automatically by detecting certain identifiers of the video content. At the next stage, the video sequence is normalized to a standard size, resolution, frame-rate etc. (stage B, as indicated by 520). At the next stage, selected segments in the video signal, which are known to be marked using one or more of the methods described above, are rendered (stage C, as indicated by 530). At the next stage, the frames in the rendered sequence are extracted (stage D, as indicated by 540). The extracted frames are compared with the various copies of the corresponding frame that were stored during the marking process (stage E, as indicated by 550). After comparison with each of the stored sequences, the likelihood that each of the stored sequences is the origin of the analyzed sequence is evaluated. (Stage F, as indicated by 560). A final decision is then made regarding the origin of the sequence, based on the results of the comparison and possibly using external knowledge, if such exists (Stage G, as indicated by 570).

Figure 6:
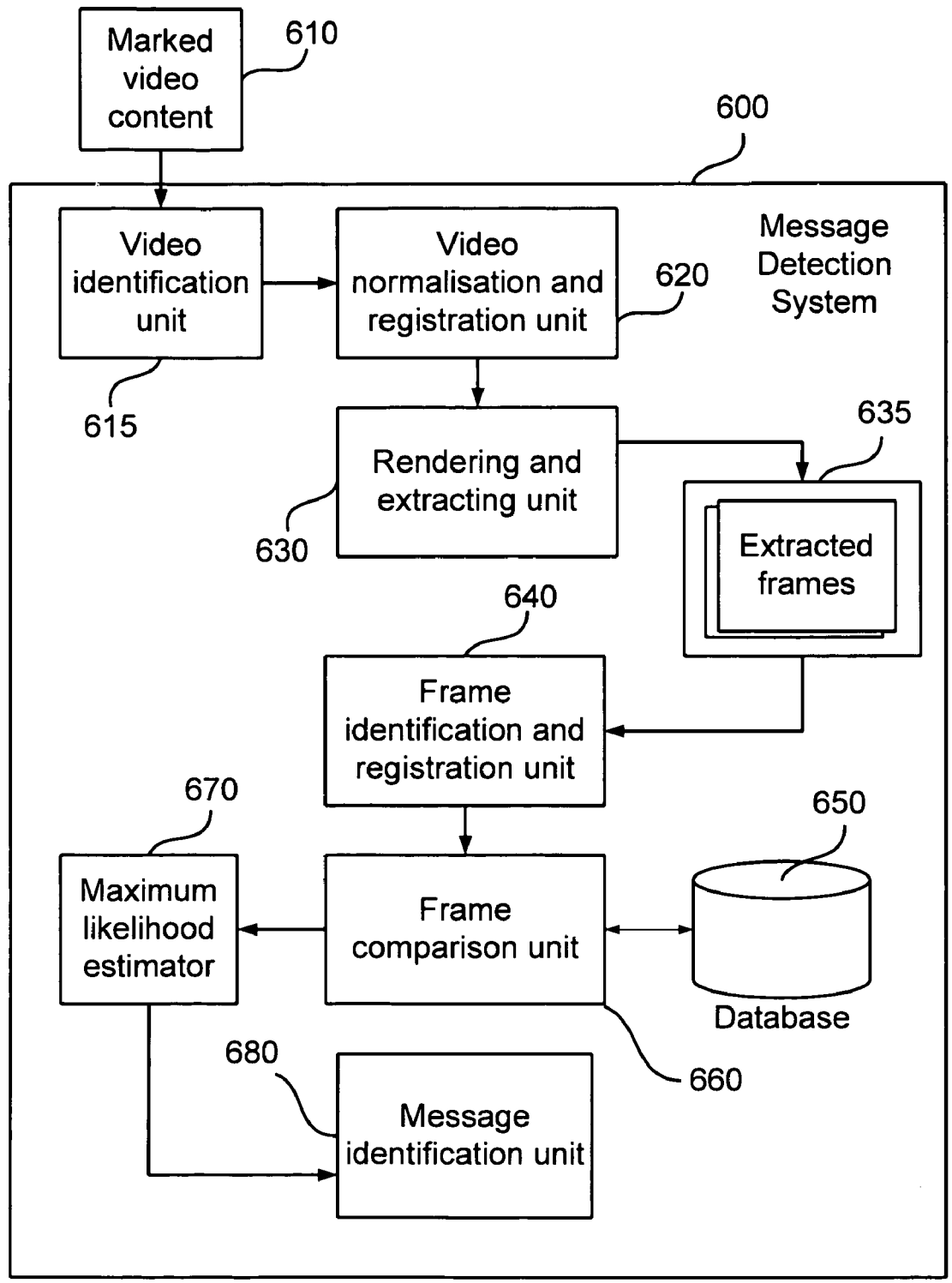
FIG. 6 is a block diagram illustrating one embodiment of a system for detection of the hidden messages, constructed and operative according to a preferred embodiment of the present invention.

FIG. 6 is a block diagram illustrating one embodiment of a system for detection of the hidden messages, hereafter referred to as system 600, constructed and operative according to a preferred embodiment of the present invention: The input is the marked video content 610. At the first stage, marked video sequences are identified by the video identification unit 615, and are registered and normalized to the original size, frame-rate etc. by the video normalization and registration unit 620. Frames from the sequence are thereafter rendered and extracted by the rendering and extracting unit 630. The extracted frames 635 are thereafter identified and registered by the frame identification and registration unit 640. The database 650 contains sequences of frames that were subjected to various transformations, as described above. The frame comparison unit 660 compares the identified and registered frame from the identification and registration unit 640 with frames from the database 650, in order to find the closest match. The comparison process can either be based on an exhaustive search, or on a more educated (e.g., indexed) search process. The maximum likelihood estimator 670 indicates which sequence is most likely to be the origin of the examined sequence. Using this information, the message identification unit 680 attempts to identify the hidden message (steganogram) that was embedded in the examined sequence, preferably together with a confidence level parameter, which is based on the likelihood of the sequence.

In this disclosure the word frame is used for clarity. It usually denotes an image embedded in a two dimensional rectangular area, but it can also denote more complex 2-dimensional objects, specifically MPEG video object plane (VOP). It is appreciated that the methods described in this disclosure can also be implemented using video object planes and other basic units.

The methods can also be straightforwardly extended to three dimensional objects, either projected to two-dimensional space or used in a fully 3-dimensional virtual reality environment and to other, more complex objects, such as an object which changes over time.

Equation 1 can be trivially expanded for three dimensions:

$$\begin{pmatrix} x_1 \\ y_1 \\ z_1 \end{pmatrix} = \begin{pmatrix} a_0 & a_1 & a_2 \\ a_3 & a_4 & a_5 \\ a_6 & a_7 & a_8 \end{pmatrix} \begin{pmatrix} x_0 \\ y_0 \\ z_0 \end{pmatrix} + \begin{pmatrix} b_0 \\ b_1 \\ b_2 \end{pmatrix}$$

In another preferred embodiment of the present invention, the message is embedded in the video signal by subtracting selected information from the signal, in a manner that is substantially imperceptible. The information is preferably subtracted by dropping frames or parts of frames, or blurring a frame with a random blurring filter. In many cases, single frames at the beginning or the end of a film cut can be dropped without causing noticeable changes. It is preferable that the quality of the content after the dropping is monitored (e.g., by a human viewer). An educated subtracting of information provides robust marking, since, although it may be possible to locate the positions of missing frames, it is relatively hard, if not impossible, to completely reconstruct a missing frame.

Figure 7:
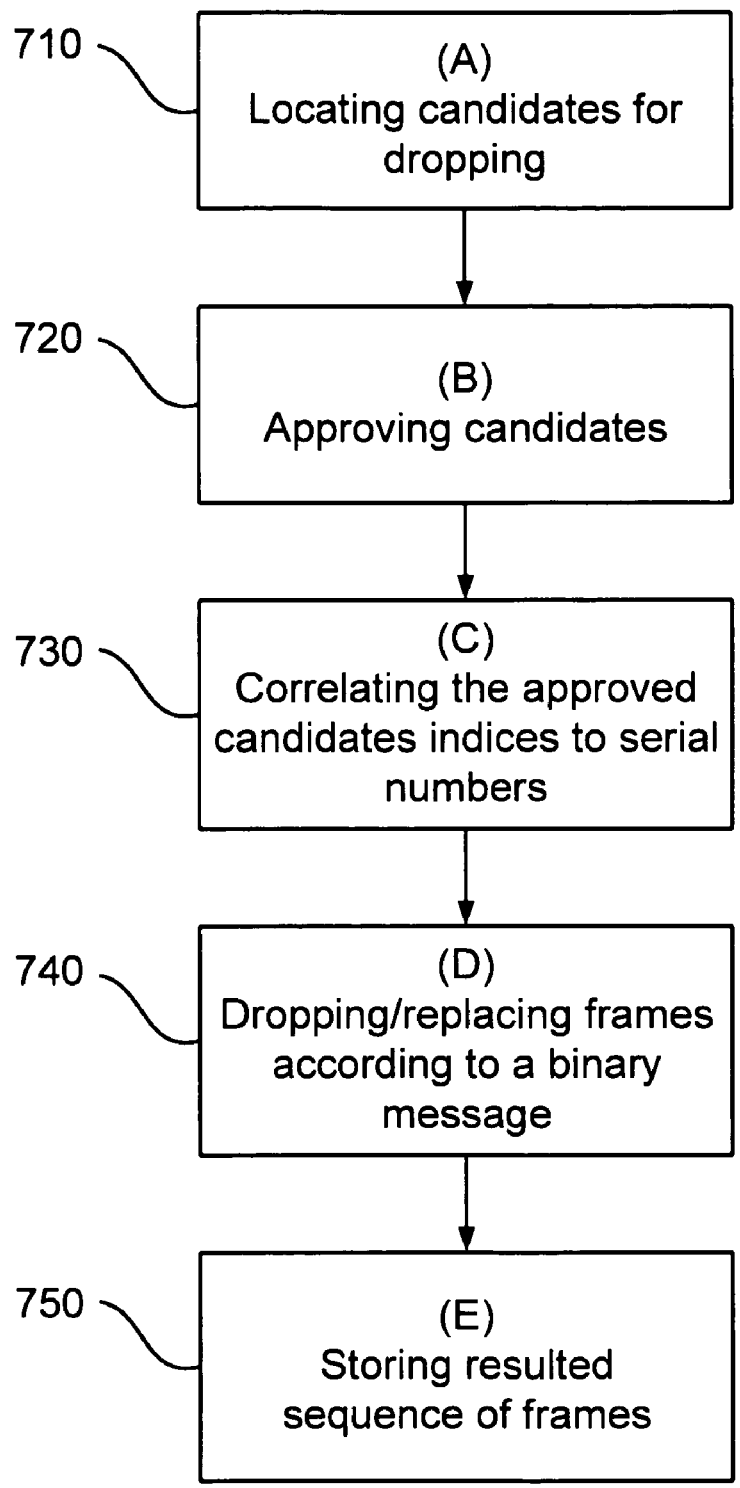
FIG. 7 illustrates the usage of a method based on frame-dropping as an information embedding process, constructed and operative according to a preferred embodiment of the present invention.

FIG. 7 is a simplified block diagram which illustrates the usage of the frame-dropping method as an information embedding process: the to-be marked video content is analyzed in order to locate candidates for frame-dropping/replacement. (stage A, as indicated by 710). Frames that are candidates for dropping/replacement are then subjected to an approval process, either manually or automatically (stage B, as indicated by 720). The frame indexes of the approved candidates are then correlated with a serial number (stage C, as indicated by 730). Given a binary message M, whose length is less than or equal to the number of bits in the message, the frame whose serial number is n is dropped or replaced if and only if the n-th bit of M is, without loss of generality, "1" (stage D, as indicated by 740). The resulted sequence of frames is then stored for further processing (stage E, as indicated by 750).

Figure 8:
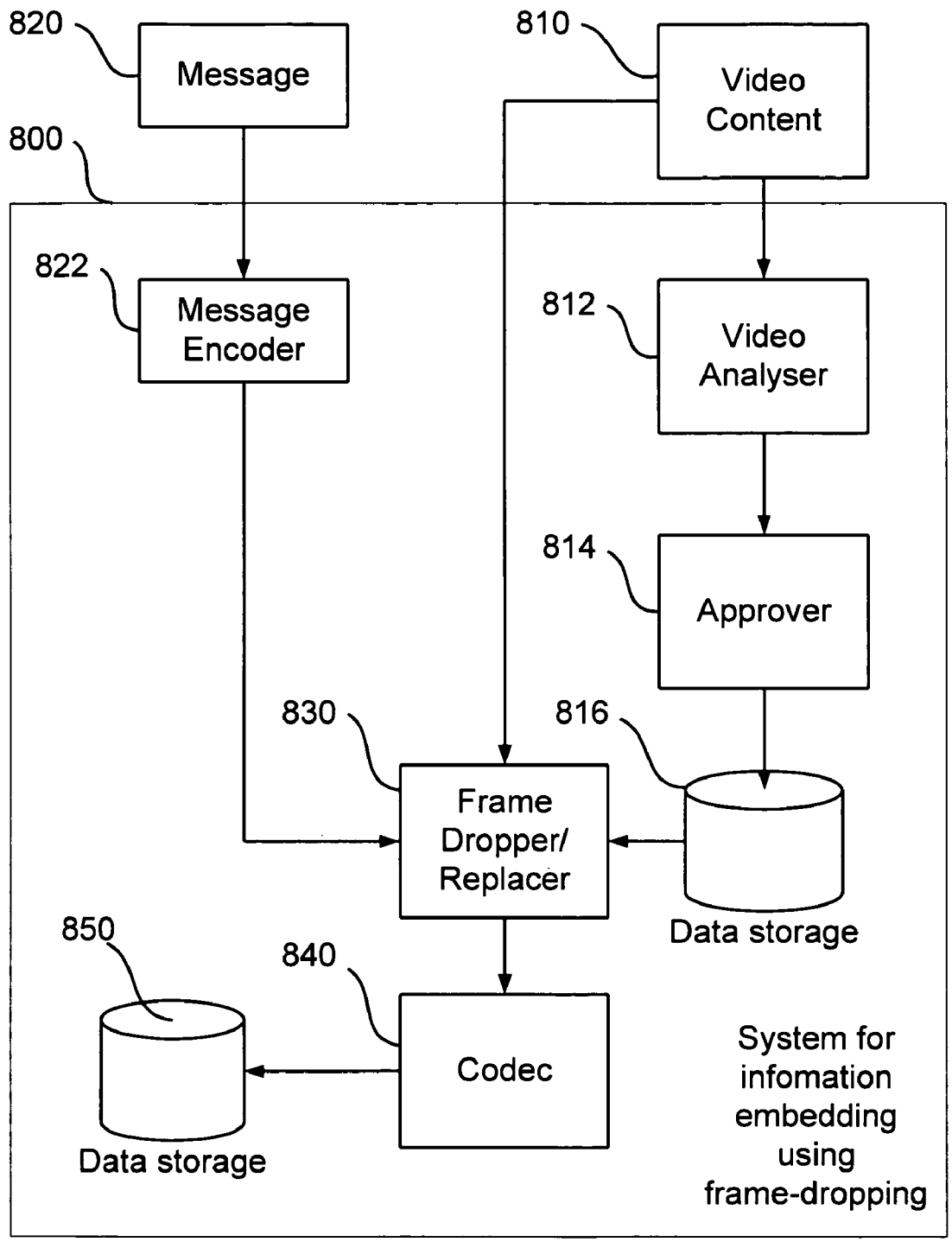
FIG. 8 illustrates a system that utilizes the frame-dropping method for information embedding in a video content.

FIG. 8 illustrates a system, hereafter referred to as system 800, which utilizes the frame-dropping method for information embedding in video content: the inputs are the to-be marked video content 810 and the message to be encoded 820. The video analyzer 812 analyzes the video content and determines the indexes of the fines that are candidates for dropping/replacing. The approver 814 approves frames for dropping or replacing. The indexes of frames that are approved for dropping/replacing are then stored in the data storage 816 together with their serial number. The message encoder 822 translates the message into a binary sequence, preferably using error-correction and/or error detection code, and uses the sequence of serial number of the frames that were approved for dropping in order to represent the message in terms of indexes of the to-be-dropped frames in a given sequence. E.g., message "A" is encoded as "17, 51, 84, 115, 148", while message "B" is encoded as "13, 37, 74, 95, 131". The sequence of the to-be dropped frames is then converted to a binary sequence of "drop/don't drop" instructions, as a function of the frame number. The frame dropper 830 gets as an input the "drop/don't drop" instructions and accordingly drops frames and preferably replaces the dropped frame with a copy of the previous or the next frame or of a frame constructed using (at least) both of them (e.g., their average). The resulted sequence of frames is thereafter compressed by the video codec 840 and the output, which is a marked video sequence is thereafter stored for future use in the data storage 850.

In general, an arbitrary replacement of frames from a sequence may reduce the quality of the video signal. It is therefore important to select the to-be dropped frame in a manner that will not effectively reduce the quality of experience of the viewer. This can be done by carefully selecting candidates for frame-dropping and monitoring the perceptual result of their dropping. The selection may be carried out either manually or automatically.

In another embodiment of the present invention, the frame is blurred instead of being dropped. In this case the blurring filter is preferably not the same in various parts of the picture.

In another embodiment of the present invention, the frames before and/or after the dropped frames are also blurred, thereby reducing the discontinuity in the frame acuity.

In another embodiment of the present invention, the sequence is first compressed in a lower frame-rate and then recompressed in the desired frame-rate, in order to smooth the jump in the video signal.

In another embodiment of the present invention, only parts of the frames are "dropped" and replaced, e.g., by the corresponding part in the previous or subsequent frame, or by the average of the two.

In another embodiment of the present invention, a marking scheme, similar to the one described above, is performed on compressed media, without uncompressing the content or rendering the frames.

In another embodiment of the present invention, hidden information is embedded in the video sequence by altering the frame-rate parameter of the video sequence.

Figure 9:
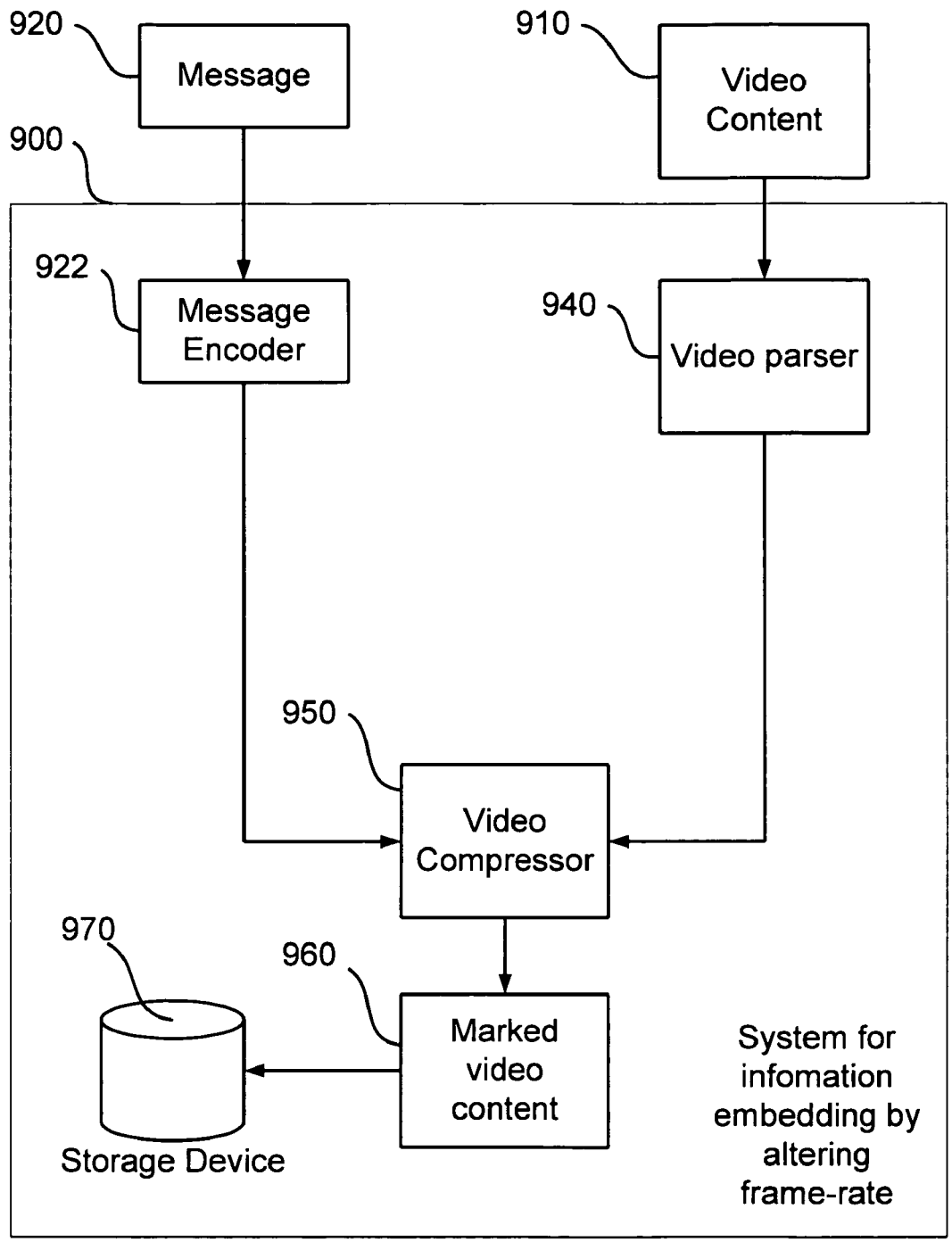
FIG. 9 is a block diagram illustrating a system for embedding information in a digital video file by changing the nominal frame-rate, constructed and operative in accordance with a preferred embodiment of the present invention.

FIG. 9 is a block diagram illustrating a system for embedding information in a digital video file by changing the nominal frame-rate, hereafter referred to as system 900, constructed and operative according to a preferred embodiment of the present invention. The inputs are the video content 910 and the message to-be embedded 920. The message encoder 922 encodes the message in terms of an n-symbols alphabet, whose size n is determined by the number of different frame-rates that are going to be used for the encoding, E.g., if frame-rates of 30, 29.5, 30.5 and 31 frames-per second are used, then n=4. The encoder preferably utilizes error correction and error detection code in order to further enhance the robustness of the method. The video parser 940 parses the video sequence into sub-sequences, and the video compressor 950 preferably compresses each sub-sequence using a frame rate that is determined by the encoder 930. The variations in the frame-rate are preferably small enough, in order not to reduce the quality of the content. The output is marked video content 960 that can be stored for further usage in the storage device 970.

In order to further increase the robustness of the marking, two or more of the methods described above may be combined.

In another embodiment of the present invention, "key frames" (i.e., salient frames, that differ substantially from previous frames) are identified using any of the existing methods for key-frame detection. The key frames are listed and (preferably) stored. A frame-based watermark can thereafter be embedded on the key frames. In many cases, while compressing a video sequences key-frames are compressed only with respect to themselves ("I-frames"), and therefore frame-based watermarks on key-frame are more robust against video recompression. The notion of key frames can also be used for the selection of the to-be-dropped frames: a key-frame that is the first frame in a "cut" can be dropped, in general, without substantially effecting the quality of experience. However, in some cases, dropping a key-frame may defect the content. Therefore, monitoring the effect of key-frame dropping can enhance the effectiveness of the "frame-dropping" marking process described above. (not very important)

Some video compressing standards support, besides or instead of video frames, more complex basic units. E.g., the MPEG4 standard supports "video object planes" (VOP). It is appreciated that all the above methods can also be implemented using video object planes and other basic units.

EXAMPLES

Reference is now made to the following examples, which together with the above descriptions illustrate some aspects of the invention in a non-limiting fashion.

Figure 10:
FIGS. 10-12 show the sequences to which different embodiments of the invention have been applied.

FIG. 10 shows three images: the uppermost is an original image; the central image is an image that is slightly transformed. These two images look the same. Averaging of the two images in an attempt to attack an underlying watermark causes a blur that substantially reduces the quality of the content, as shown in the bottom image.

Figure 11B:

FIG. 11 shows two sequences of frames: The sequence in FIG. (11a) is the original sequence, and the sequence in FIG. (11b) is the sequence that results from dropping the middle frame, copying the next frame and recompression.

Figure 12:
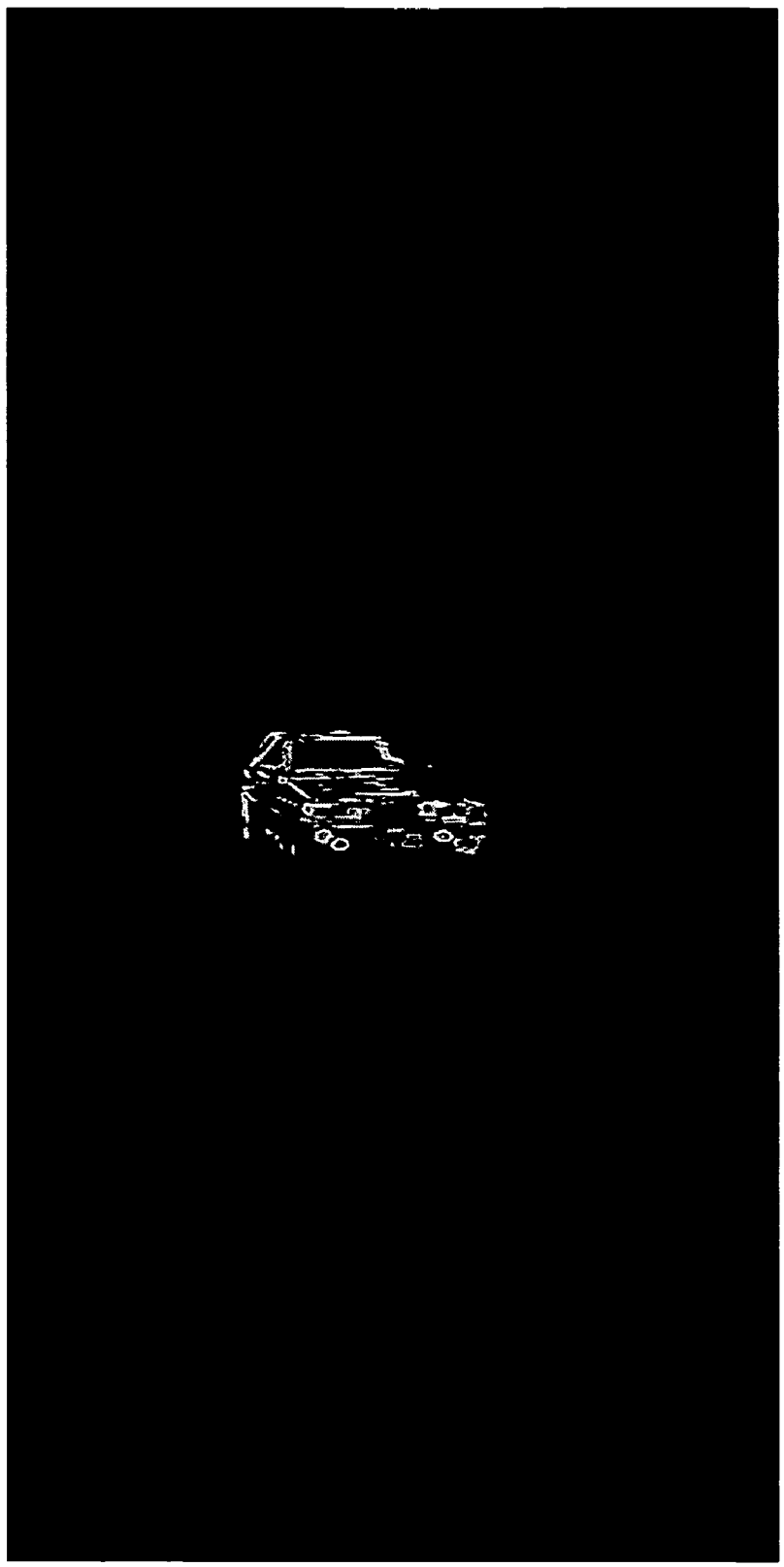

FIG. 12 shows the results of averaging and subtracting the two sequences.

It is appreciated that one or more steps of any of the methods described herein may be implemented in a different order than that shown, while not departing from the spirit and scope of the invention.

While the present invention may or may not have been described with reference to specific hardware or software, the present invention has been described in a manner sufficient to enable persons having ordinary skill in the art to readily adapt commercially available hardware and software as may be needed to reduce any of the embodiments of the present invention to practice without undue experimentation and using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

We claim:

1. A method for robust embedding of information into video content, said method comprising:
    breaking said video content into a series of sequential units;
    selecting at least one group of sequential units from said series, said group comprising at least one sequential unit;
    selecting at least one parameter for at least one of said groups; and
    changing a unit rate of the sequential units of at least one of said groups according to said parameter selected for said group, thereby to embed information within said group.

2. The method of claim 1, comprising:
    rendering each sequential unit of said series to provide rendered video content; and
    performing at least one geometric transformation directly on the pixels of each of said at least one selected sequential unit following said rendering according to said at least one parameter selected for said unit, thereby to embed said information in said rendered video content.

3. A method according to claim 2, wherein at least some of said information embedded in said units is encoded into the at least one of said parameters controlling said geometric transformations.

4. A method according to claim 2, wherein said geometric transformation is operable to impede the disruption of said embedded information, wherein said disruption is performed by combining several different versions of said video content, and wherein at least one of said different versions of said video content contain different versions of said geometric transformations.

5. A method according to claim 2, wherein said method further comprises restricting the amount of change of at least one of said parameters between at least two consecutive units in said series of units.

6. A method according to claim 5, wherein said method further comprises locating at least one unit within said series of units, said unit being different from the unit preceding said located unit, and wherein the change of at least one of said parameters between said located unit and said unit preceding said located unit is not restricted.

7. A method according to claim 2, wherein said method further comprises locating at least one key unit within said series of units, said key unit being different from the unit preceding said located key unit, and wherein said method comprises utilizing the information about the location of said at least one key unit in said video content.

8. A method according to claim 7, wherein said utilizing said information about the location of said at least one key unit in said sequence comprises performing said geometric transformations only on said key units in said locations.

9. A method according to claim 7, wherein said utilizing said information about the location of said at least one key unit in said sequence comprises breaking said series into segments based on said information, and wherein said method further comprises utilizing the same value of at least one of said parameters for all units within said video content.

10. A method according to claim 2, wherein said geometric transformation comprises an affine transformation.

11. A method according to claim 2, wherein said method utilizes parameters which control said geometric transformation, and wherein at least one of said parameters which control said geometric transformation depends on the spatial location within said unit.

12. A method according to claim 11, wherein said method further comprises restricting the amount of change of said parameters which control said geometric transformation between at least two proximate spatial locations within said at least one unit.

13. A method according to claim 11, wherein the spatial location within at least one of said units is not changed by said method.

14. A method according to claim 2, wherein said parameter depends on the data within a respective unit.

15. A method according to claim 2, further comprising reading at least some of said embedded information using image matching techniques.

16. A method according to claim 2, further being performed on compressed video content, and wherein said video content is not fully decompressed and rendered during the operation of said method.

17. A method according to claim 2, wherein said method further comprises the step of approval of said selection of units.

18. A method according to claim 2, wherein said unit comprises at least one of the following: a rectangular visual object; a frame of said video content; at least one visual object; at least one compressed object; a video object plane; at least one projectable three dimensional object; at least one four dimensional object that contains time dependent properties; at least one three dimensional object; and at least one visually representable object.

19. A method according to claim 1, wherein said embedded information is imperceptible.

20. A method according to claim 1, further comprising utilizing another independent method to embed information within said units.

21. A method according to claim 1, wherein at least some of said information embedded in said units is encoded into at least one of said parameters.

22. A method according to claim 1, wherein said method is operable to impede disruption of said embedded information, wherein said disruption is performed by combing several different versions of said video content, wherein at least one of said different versions of said video content contain different versions of said change of unit rate.

23. A method according to claim 1, wherein said parameter controlling said change of unit rate depends on the data within said units.

24. A method according to claim 1, being performed on compressed video content, and wherein said video content is not fully decompressed and rendered during the operation of said method.

25. A method according to claim 1, wherein said unit comprises at least one of the following: a rectangular visual object; at least one visual object; a frame of said video content; at least one compressed object; a video object plane; at least one projectable three dimensional object; at least one four dimensional object that contains time dependent properties; at least one three dimensional object; and at least one visually representable object.

26. The method of claim 1, wherein:
each sequential unit comprises a frame of said video content;
rendering each sequential unit of said series to provide rendered video content; and
removing said at least one selected sequential unit from said rendered video content, said removed content constituting said robust embedded video content.

27. A method according to claim 26, being operable to impede disruption of said embedded information, wherein said disruption is performed by combining several different versions of said video content, wherein different sets of units were removed from at least one of said different versions of said video content.

28. A method according to claim 26, wherein said method further comprises locating at least one key unit within said series of units, said key unit being different from the unit preceding said located at least one key unit, and wherein said method comprises utilizing the information about the location of said key units within said video content.

29. A method according to claim 28, wherein said utilizing said information about the location of said key units in said video content comprises removing only at least one of the following: at least one of said key units; and at least one of the units preceding said key units.

30. A method according to claim 26, wherein said selection depends on the data within said units.

31. A method according to claim 26, wherein at least one of said removed units are replaced by new units.

32. A method according to claim 31, wherein at least one of said new units are constructed utilizing the data in at least one of the units surrounding said removed unit.

33. A method according to claim 32, wherein at least one of said new units is created by interpolation of at least two units.

34. A method according to claim 32, wherein at least one of said new units is created by duplication of another unit.

35. A method according to claim 31, wherein at least one of said new units are constructed utilizing the data in said removed unit.

36. A method according to claim 35, wherein at least one of said new units are constructed utilizing the data in both said removed unit and in at least one of the units surrounding said removed unit.

37. A method according to claim 35, wherein at least one of said new units is a blurred version of said removed unit.

38. A method according to claim 37, wherein at least one of said blurred version of said removed units contain different levels of blur over the space of said unit and wherein said different levels of blur are dependent on the data within said unit.

39. A method according to claim 37, wherein at least one of the units surrounding said new units is also blurred to reduce discontinuity in said video content.

40. A method according to claim 26, wherein said method further comprises a step of approval of said selection of said units.

41. A method according to claim 26, wherein said method further comprises the following steps for reducing discontinuity caused by removed units:

compressing said series in a low unit rate; and recompressing said series in the desired unit rate.

42. A method according to claim 26, wherein said method is performed on compressed video content, and wherein said video content is not fully decompressed and rendered during the operation of said method.

43. A method according to claim 26, further comprising inserting new units into said video content.

44. A method according to claim 43, wherein at least one of said new units are constructed utilizing the data in at least one of the units surrounding a respective removed unit.

* * * * *